United States Patent [19]

Jackson et al.

[11] Patent Number: 5,211,853
[45] Date of Patent: May 18, 1993

[54] METHOD FOR THE REMOVAL OF CHROMIUM COMPOUNDS FROM AQUEOUS SOLUTIONS

[75] Inventors: John R. Jackson; Charles L. Pitzer, both of Wilmington, N.C.

[73] Assignee: Huron Tech Corp., Delco, N.C.

[21] Appl. No.: 923,378

[22] Filed: Jul. 31, 1992

[51] Int. Cl.$^5$ .............................................. C02F 1/62
[52] U.S. Cl. ..................... 210/713; 210/720; 210/724; 210/913; 423/55; 423/607; 204/DIG. 13
[58] Field of Search ............... 210/713, 720, 724, 913; 423/55, 607; 204/DIG. 13

[56] References Cited

U.S. PATENT DOCUMENTS

| | | | |
|---|---|---|---|
| 4,268,486 | 5/1981 | Noack et al. | 423/55 |
| 4,367,213 | 1/1983 | Frorucci et al. | 210/720 |
| 4,804,528 | 2/1989 | Warren | 423/607 |

FOREIGN PATENT DOCUMENTS

| | | | |
|---|---|---|---|
| 1139080 | 1/1983 | Canada | 23/136 |
| 3032131 | 3/1981 | Fed. Rep. of Germany | |
| 218495 | 1/1968 | Sweden | |
| 218495 | 1/1968 | Sweden | 423/55 |

Primary Examiner—Stanley S. Silverman
Assistant Examiner—Neil McCarthy
Attorney, Agent, or Firm—Andrew E. Pierce

[57] ABSTRACT

A process for precipitating and removing chromium compounds in which chromium is in the hexavalent state from aqueous liquids, particularly, alkaline earth metal or alkali metal chlorate-rich solutions containing chloride, chlorate, and bichromate ions produced by the electrolysis of brine. In the process, hydroxylamine, hydroxylamine sulfate, hydroxylamine formate or hydroxylamine hydrochloride is used as a reducing agent to react and co-precipitate at a neutral or acid pH with hexavalent chromium ions present in the aqueous liquid, the reaction and precipitation taking place, generally, at a pH of about 4.0 to about 6.5 and, a temperature of about 50° C. to about 100° C. Precipitated oxides and hydroxides of divalent and trivalent chromium can be removed, for instance, by filtration. Reaction time to achieve a level of about 10 parts per million or less of chromium ions in the filtrate varies from less than about 5 hours to less than about 1 hour depending upon selection of reaction temperature and reaction pH. For instance, to achieve a level of 2 parts per million or less chromium ion after removal of the precipitate formed during the reaction at a pH of 5.0–5.5, a reaction time of 10 minutes at a temperature of 90°–95° C. is required. A reaction time of 30 minutes at a temperature of 70° C. or 120 minutes at a temperature of 60° C. provides a similar level of chromate ion removal.

12 Claims, 1 Drawing Sheet

METHOD FOR THE REMOVAL OF CHROMIUM COMPOUNDS FROM AQUEOUS SOLUTIONS

BACKGROUND OF THE INVENTION

1. Field of the Invention

This invention relates to the removal of chromium values, present, generally, in the form of alkali metal or alkaline earth metal dichromates, from aqueous liquids such as electroplating wastewater but, particularly, electrolytically-produced aqueous alkali or alkaline earth metal chlorate solutions.

2. Description of the Prior Art

An aqueous solution of sodium chlorate and sodium chloride is conventionally produced by the electrolysis of aqueous sodium chloride in diaphragmless electrolytic cells. The extent of electrolysis is controlled to produce a product from the cell in which the sodium chlorate and sodium chloride have the desired ratio, usually in the range of about 1:1 to about 20:1 and preferably in the range of about 2:1 to about 15:1. The aqueous solution may be further processed to crystallize out the sodium chlorate for sale in crystal form for a variety of purposes, for example, in the production of chlorine dioxide for use in the bleaching of chemical cellulosic pulps by reduction in the presence of a strong mineral acid, usually, sulfuric acid, or the aqueous solution may be used directly for that purpose.

In the electrolysis of sodium chloride to form sodium chlorate, it is conventional to add chromates in the hexavalent state, usually in the form of sodium bichromate dihydrate, $Na_2Cr_2O_{7bl}.2H_2O$, to the electrolyte in the cell to improve significantly the current efficiency of the cell in the conversion of sodium chloride to sodium chlorate. The cell product, also known as "cell liquor", therefore, generally contains significant amounts of chromate ions.

It is desirable to remove chromate ions from the cell product before employment of the same in chlorine dioxide generation and it is desirable to recover chromate ion for reuse in the electrolytic cells. In addition, chromate ions are a toxic pollutant, so that environmental considerations require removal of the chromate ions where discharge of a product stream containing such ions may be effected. A number of prior proposals have been made for the removal of chromate ions from cell liquor. This invention also relates to a method for treating electroplating wastewater or other aqueous liquids containing hexavalent chromium ions as a contaminant. Electroplating wastewaters often bear large amounts of heavy metal contaminants such as copper, cadmium, nickel, and chromium. While these heavy metals readily form hydroxides or sulfides, with the notable exception of chromium, the removal of chromium generally requires an additional treatment step to reduce the chromium ions from the hexavalent to the trivalent state prior to precipitation.

Among the chemicals used in the treatment of wastewater for reducing hexavalent chromium ions to the trivalent state, it is known to use ferrous sulfate, sodium bisulfite, sulfur dioxide, and sodium sulfide. While these chemicals work well as reactants for reducing the hexavalent chromium ions to the trivalent state, the quantity of sludge produced by each of these reactants can vary drastically. Since it is no longer sufficient merely to produce clean water, the volume of sludge produced for disposal is nearly as important as the product quality. It is known from U.S. Pat. No. 4,705,639 that in the disclosed sodium sulfide/ferrous sulfate treatment of wastewater for chromium ion reduction, the rate of chromium ion reduction depends upon the pH of the wastewater. In this process the electroplating wastewater is adjusted to a pH of about 8 to 10, treated with sodium sulfide and, thereafter, treated with ferrous sulfate or ferrous chloride to reduce the hexavalent chromium ions to the trivalent state. A process for the removal of hexavalent chromium ions from wastewater is also disclosed in U.S. Pat. No. 4,260,491 in which an aqueous composition containing hexavalent chromium ions and a chelating agent for trivalent chromium ions is treated at about pH 5 with both (1) a known reducing agent for converting hexavalent chromium ions to trivalent chromium ions and (2) with ferric or aluminum chloride or sulfate. This treatment is effective in producing a precipitate of chromic hydroxide and ferrous hydroxide upon raising the pH to about 7.5 to about 10.

In the processes discussed above for the removal of dichromates from electroplating baths and other metal treatment solutions, chloride ion is, typically, absent from such metal treatment solutions and, accordingly, very low levels of chromium ions can be obtained in the treated plating baths by reduction of the chromium ions contained therein from the hexavalent state to the trivalent state followed by the precipitation of the trivalent chromium ions as hydrated chromic oxide. The problem of achieving low levels of chromium ions in liquid solutions containing chloride ions is made more difficult by the fact that hydrated chromic oxide has a solubility product higher by a factor of $10^5$ when in the presence of chloride-containing solutions.

A solution of sodium chlorate, prepared as a feed for a chlorine dioxide generator of the R-2, R-3, and SVP process type, produced by the electrolysis of sodium chloride, generally, has a chloride content of about 200 grams per liter. Low levels of bichromate ions are required in electrolytic cell liquors in cells for the production of alkali metal chlorates, particularly, sodium chlorate, in order to increase the current efficiency of the cells, for instance, from about 70% current efficiency to about 95% current efficiency. In addition, the presence of low levels of bichromate ion in electrolytic chlorate cells inhibits the formation of explosive mixtures of hydrogen and oxygen. It has been estimated that for every ton of sodium chlorate solution prepared in electrolytic chlorate cells, about 2-10 kilograms of sodium dichromate are present as a contaminant where no effort is made to remove the sodium dichromate.

Although the sodium dichromate has no effect on chlorine dioxide production by reduction of sodium chlorate utilizing the Rapson R-2 process, in the more modern chlorine dioxide processes in which methanol is used as the reducing agent, the presence of chromium ions reduces process efficiency by preventing the smooth operation of the chlorine dioxide generating process. That is, the presence of chromate ions inhibits the crystal growth of the sodium sesquisulfate by-product of the process and thus, makes more difficult its removal. In addition, the environmental impact of the discharge of chromium compounds in the pulp mill product is a serious environmental concern in view of the fact that a 100 thousand tons per annum sodium chlorate plant producing 10 percent of its product as cell liquor would discharge the equivalent of some 20-100 tons per annum of sodium dichromate.

There are a number of methods in the prior art for the removal of alkali and alkaline earth metal chromates from cell liquors. Prior art methods include reduction of the chromate to mixed chromous and chromic salts with the precipitation of insoluble hydroxides in processes in which reduction is effected by water soluble sulfides, hydrazine, hydroxylamine, sulfites, ion exchange techniques, precipitation to form barium chromate, and electrochemical means. Many of these processes present problems which make their use either uneconomic or otherwise undesirable. Some of these processes are discussed below.

In U.S. Pat. No. 4,086,150 and U.S. Pat. No. 3,843,769 there are described methods for removing hexavalent chromium ions from concentrated aqueous alkali metal chlorate solutions by treating such solutions with a water soluble sulfide. In the '769 patent, the concentrated aqueous alkali metal chlorate solutions are treated with a water soluble sulfide under acid conditions, especially at pHs below 4 and at temperatures above ambient. Thereafter, the treated mixture is neutralized and insoluble compounds in which chromium is present in the trivalent state are removed by filtration. In the '150 patent, the chlorate liquor containing compounds of chromium in the hexavalent state are treated at a temperature of about 40° to 60° C. with a water-soluble sulfide at an initial pH in the range of 7-8. Thereafter, a water-soluble ferrous salt is added to the treated solution and the pH is adjusted to obtain a final pH of about 1.8 to about 3.0 so as to convert the chromate to an insoluble trivalent chromium-containing material in which chromium is in the trivalent state.

In U.S. Pat. No. 4,699,701, a process is disclosed for the removal of chromium compounds from chlorate solutions utilizing the cathodic reduction of chromium ions in the hexavalent state to chromium ions in the trivalent state and the deposition of chromium ions in the trivalent state on the cathode as chromium hydroxide.

The removal of hexavalent chromium ions in the hexavalent state from chromate cell liquor by ion exchange processes is described in U.S. Pat. No. 4,376,099 and U.S. Pat. No. 3,835,001. The use of hydrazine to selectively remove chromate ions from a chlorate solution is described in U.S. Pat. No. 4,268,486, Canadian 1,139,080, Canadian 1,119,772, and U.S. Pat. No. 4,367,213.

The use of ammonia or an amine as a means of reducing chromium ions in the hexavalent state to divalent or trivalent state chromium ions is disclosed in several prior art patents. In U.S. Pat. No. 4,804,528, there is described the use of a two-stage process in which ammonia is added to a chlorate-rich solution containing hypochlorite and dichromate ions produced by the electrolysis of brine. Under controlled conditions of pH and temperature, a mixed divalent and trivalent state chromium compound, i.e., chromium hydroxide, is precipitated from solution and removed. In this process ammonia is added to a chlorate cell liquor at a pH above 8.5 and at a temperature greater than 60° C. Preferably, the pH of the solution during this reaction is above approximately 10.5. The reaction takes place over a period of about 30 minutes at a temperature of 80° C. The precipitate of chromium hydroxide is removed by filtration.

In U.S. Pat. No. 4,446,026, there is disclosed a process for the extraction of chromates from an aqueous solution, for instance, from a sodium chlorate liquor produced by the electrolysis of brine, by contacting the aqueous chlorate cell liquor with an organic phase consisting of a tertiary or a quaternary amine so as to extract the chromate compounds. In this process, the reaction is conducted at a pH lower than 6 and at a temperature of about 35° C.

In U.S. Pat. No. 4,956,154, a process is disclosed for the extraction of chromium ions from aqueous product solutions utilizing an extractant comprising in organophosphinic acid, a di-2-ethylhexyl phosphoric acid and/or an aliphatic amine to selectively separate chromium ions and other contaminating metal ions. The process is conducted at a pH of about 6.5 to 7.5.

In addition to the use of hydrazine as a reducing agent for the removal of compounds containing chromium in the hexavalent state from chlorate cell liquors, as illustrated in Canadian Patent 1,139,080 and Canadian Patent 1,119,772, hydroxylamine or addition compounds thereof such as hydroxylamine hydrochloride have been disclosed in the prior art as reducing agents for the removal of chromium compounds containing chromium in the hexavalent state from electroplating baths, electrolytic and non-electrolytic cleaning baths and from chlorate cell liquors. In Swedish Patent 218,495, a reducing agent selected from the group consisting hydrazine or a hydroxylamine, or an addition compound or salt thereof is utilized as a reducing agent in an electroplating bath, also containing copper and nickel ions, for the removal of chromium compounds containing chromium in the hexavalent state from plating baths and cleaning baths. The presence of hexavalent chromium ions in such baths leads to inferior quality deposits of copper and nickel from these baths. In German 3,032,131, a process is disclosed for the removal of dichromates from chlorate solutions utilizing hydroxylamine hydrochloride as a reducing agent at a concentration of at least 4 mol per mol of dichromate. The process is conducted at a temperature not under about 40° C. and at a pH over 7. Preferably, the pH of the reactant solution is about 8 so as to cause the compounds produced containing chromium in the trivalent state to precipitate in the form of chromic hydroxide. Where the pH of the reactant solution is acidic prior to treatment with hydroxylamine hydrochloride, the pH can be subsequently adjusted to the desired value so as to cause the precipitation of chromic hydroxide.

In the process of the instant invention, improved efficiency of removal of compounds containing chromium in the hexavalent state can be obtained by conducting the reaction at elevated temperature and under neutral or acid pH conditions.

SUMMARY OF THE INVENTION

A batch or continuous process is disclosed for the removal of chromium compounds containing chromium in the divalent, trivalent, and hexavalent state in aqueous solutions, particularly, in aqueous solutions containing an alkaline earth metal or an alkali metal chlorate and an alkaline earth metal or alkali metal chloride, more particularly, aqueous solutions containing sodium chlorate and sodium chloride, by reacting said solutions with a reducing agent, generally, consisting of hydroxylamine, an addition compound, or salt thereof, preferably, hydroxylamine sulfate, hydroxylamine formate, and hydroxylamine hydrochloride, generally, in at least an amount sufficient to react with, or in an amount in excess of the amount required to react with the divalent, trivalent, and hexavalent chromium ions contained therein. Preferably, an amount up to 10% and, most preferably, an amount up to 5% in excess of the stoichiometric amount of reducing agent is used.

The reaction is conducted at a neutral or acid pH, generally, at a pH of about 4.0 to about 6.5 and at an elevated temperature, generally, at a temperature of about 50° C. to about 100° C. Lower temperatures are suitable if longer reaction times are used. The process of the invention results in the formation of an easily filterable precipitate having fewer and a lesser amount of heavy metal contaminants. The total chromium ion levels are, generally, reduced to about 10 parts per million or less in the liquid filtrate separated from the precipitate. If the liquid is separated, for instance, by filtration, the filtrate can be fed directly to chlorine dioxide generators, including those chlorine dioxide generators in which methanol is used as the reducing agent. The precipitate comprising chromium ions can be recycled directly to an electrolytic cell for the production of alkali metal chlorate by the electrolysis of an alkali metal chloride.

BRIEF DESCRIPTION OF THE FIGURES

The objects and advantages of the present invention will be more clearly understood when considered in conjunction with the accompanying drawings, in which.

DETAILED DESCRIPTION OF THE INVENTION

Figure 1:
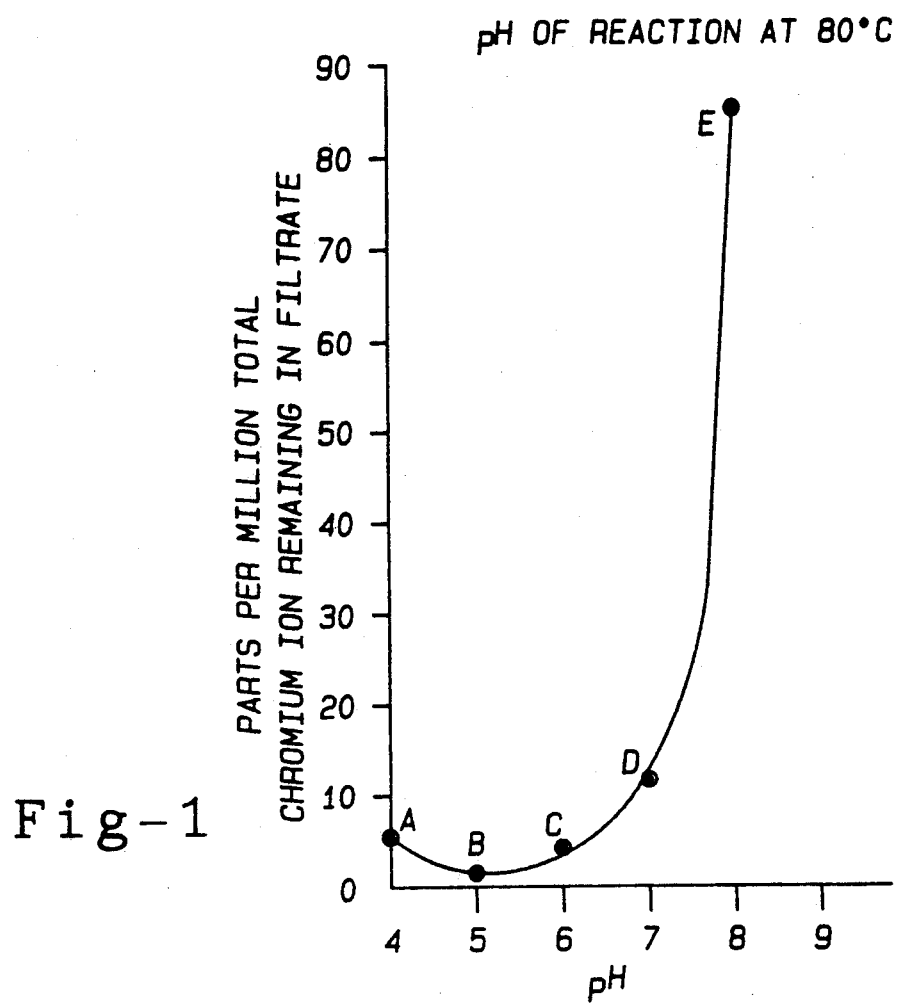
FIG. 1 is a graph showing the amount of hexavalent chromium ions remaining in the filtrate of an aqueous chlorate solution subsequent to reaction at 80° C. with hydroxylamine sulfate at various pH conditions. In this reaction, a mol ratio is used of 2 mol hydroxylamine sulfate to 1 mol of sodium bichromate dihydrate ($Na_2Cr_2O_7.2H_2O$).

It is an object of the present invention to provide a batch or continuous process for removing compounds containing chromium in the divalent, trivalent and hexavalent state, generally, from aqueous liquids, and, particularly, from aqueous liquids containing chlorate ion, such as those aqueous liquids derived from the electrolysis of brine wherein an alkaline earth metal hydroxide or an alkali metal hydroxide formed at the cathode reacts with chlorine formed at the anode to produce an alkaline earth metal chlorate or an alkali metal chlorate. Alkali metal chlorate, and in particular sodium chlorate, has been produced by the electrolysis of aqueous solutions of alkali metal chlorides, such as sodium chloride in electrolytic cells equipped with or without membranes or diaphragms. Typically, electrolytic cells make chlorates within the cell by reacting chlorine produced at the anode with alkali metal hydroxide produced at the cathode. One such representative electrolytic cell of this type is shown in U.S. Pat. No. 3,732,153 by C. J. Harke et al.

Various other arrangements of both electrochemical and combinations of electrochemical and chemical methods for manufacturing chlorates have also been proposed, such as the use of a two compartment permselective membrane equipped electrolytic cell operating in conjunction with a diaphragmless-type electrolytic chlorate cell. This method is disclosed in U.S. Pat. No. 3,897,320 to E. H. Cook. However, to obtain improved current efficiencies and significant reductions in electrical power requirements in the production of inorganic chlorate, U.S. Pat. No. 3,464,901 provides for the electrochemical preparation of chlorine and caustic soda in a diaphragm type chloralkali cell. The caustic soda containing unreacted alkali metal chloride and alkali metal chlorate is then removed from the cell and mixed and chemically reacted with chlorine from the anolyte of the cell. The chemical reaction is carried out at a pH of 6 to 8 to convert the alkali metal hypochlorite to chlorate. However, in order to maintain the conditions most favorable for converting hypochlorite to chlorate additional caustic and/or acid over and above that supplied by the cell has to be added to the reaction mixture. In the case of Japanese Pat. No. 792,025 dilute chlorine is reacted with less than 20 percent caustic soda to produce a concentrated sodium hypochlorite solution with sufficient caustic remaining in it to produce a pH of 8 to 10. The solution is subsequently diluted from about 13 to 15 percent sodium hypochlorite to 6 to 8 percent sodium hypochlorite with a recycled stream of alkali metal chloride and chlorate. The diluted stream is then acidified with hydrochloric acid to a pH of about 6.0 and finally fed to an electrolysis cell.

The electrochemical generation of sodium chlorate is one of the simplest electrochemical processes and is the second largest application of electrosynthesis. Current world capacity approaches 3 million tons per annum. As indicated above, sodium chlorate is used as an intermediate by the paper industry to produce chlorine dioxide for bleaching of wood pulp. In this use, it is replacing chlorine because it is desirable to reduce the level of toxic chloro-organic compounds which are produced during chlorine bleaching and, ultimately, discharged with pulp mill products.

Modern processes for the preparation of chlorine dioxide by reduction of chlorate involve the use of methanol as a reducing agent. The older processes can be summarized in the following gross process equations:

$$2NaClO_3 + SO_2 \rightarrow 2ClO_2 + Na_2SO_4 \qquad \text{I.}$$

(the Mathieson process)

$$2NaClO_3 + CH_3OH + H_2SO_4 \rightarrow 2ClO_2 + HCOOH + H_2O + Na_2SO_4 \qquad \text{II.}$$

(the Solvay process)

$$NaClO_3 + NaCl + H_2SO_4 \rightarrow ClO_2 + \tfrac{1}{2}Cl_2 + H_2O + Na_2SO_4 \qquad \text{III.}$$

(the Rapson R-2 process, see the Canadian patent specification No. 543,589)

Thus, the reducing agent in these processes is sulphur dioxide, methanol and chloride ion respectively. Other reducing agents, such as chromic acid or nitrogen oxides have also been tested, but principally due to their higher prices they have not been commercially utilized to a considerable degree. All these processes take place with an excess of strong acid, usually sulfuric acid, and, therefore, the spent liquor or solids from the reactor will consist of sodium sulphate in strong sulfuric acid. It is essential from an economical, as well as, environmental point of view that these products be utilized.

A more modern process equation representing the use of methanol as a reducing agent in the reduction of chlorate is as follows:

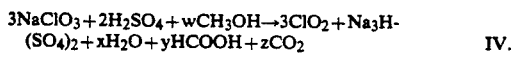

(the Rapson R-8 process)

Previously this liquor and solids have been disposed of in the sewage system. However, the most usual thing has been to use it as "make up" in the cellulose plant, but in that case its content of sulfuric acid has not been utilized and chemicals have been necessary for its neutralization. Sometimes its high content of sulfuric acid has made it useful for other purposes, e.g., in the plant for resin cooking.

Increasingly rigorous environmental demands and rules for the washing of gases from boilers and evaporators and increased closing of the drainage system of the plants have in many cases reduced the need of make up so much that the reactors will produce an excess of sodium sulphate and sulfuric acid which can not be disposed of in the sewage system.

Ninety-five percent of the sodium chlorate produced is used in the pulp and paper industry to manufacture chlorine dioxide. Chlorine dioxide has been shown to reduce the production of dioxin and chlorinated organics when substituted for chlorine in the pulp bleaching process. Accordingly, the use of chlorine for bleaching with pulp has been sharply reduced and the demand for chlorine dioxide in the pulp and paper industry has risen rapidly over the past few years. Since chlorine dioxide is made by reducing an aqueous solution of sodium chlorate, as indicated above, pulp mills have two options for supplying chlorine dioxide generators with an aqueous solution of sodium chlorate: (1) purchase sodium chlorate and obtain shipment thereof via railcar or truck and (2) prepare an aqueous solution of sodium chlorate at the pulp mill. The advantages of manufacture of an aqueous solution of sodium chlorate at the pulp mill are well documented in the literature. Most of the advantages to be obtained are the result of the ability of pulp mill sodium chlorate manufacturing facilities to prepare the aqueous sodium chlorate solution at the proper concentration and quality desired so as to properly feed the chlorine dioxide generators directly. This procedure eliminates crystallizing the sodium chlorate, shipping, unloading, and handling the sodium chlorate which would be otherwise purchased from off-site manufacturers. With pulp mill sodium chlorate requirements ever increasing, the advantages of on-site sodium chlorate solution manufacture are greater than ever. In addition, a recent development is the change over to the methanol type R-8 process for generation of chlorine dioxide in which methanol is utilized as a reducing agent for the sodium chlorate. In the older processes for the generation of chlorine dioxide, referred to above as the Rapson R-2 process, the chlorine dioxide generators are fed with a sodium chlorate aqueous solution having equimolar concentrations of sodium chloride and sodium chlorate. Thus, about 200 grams per liter of sodium chloride and 340 grams of sodium chlorate are contained in chlorine dioxide aqueous feed solutions in which the Rapson R-2 process used. In these processes, the presence of bichromate ions as an impurity appears to catalyze the chlorine dioxide reaction. In these processes, the chloride ion serves as the reducing agent. In the Rapson R-2 process, chlorine is produced as a by-product in the amount of about 0.5-0.7 mols of chlorine per mol of chlorine dioxide. The by-product salt cake is primarily sodium sulphate.

Because of the need to eliminate chlorine as a bleaching agent for the pulp and paper industry, this chlorine by-product from the chlorine dioxide generators has become objectionable and, accordingly, most pulp and paper mills have changed to the modern Rapson R-8 process since in this process chlorine is not generated in significant amounts as a by-product. In the R-8 process, the by-product salt cake is $Na_3H(SO_4)_2$. Crystals of this salt cake fail to grow satisfactorily in the presence of bichromate ions present as an impurity and, accordingly, the process fails to operate smoothly as these crystals are difficult to filter. This difficulty in the filtration of the by-product salt cake is an important reason for providing chromate ion free alkali metal chlorate aqueous solutions as feed solutions for chlorine dioxide generators utilizing the R-8 process in which methanol is the reducing agent. In addition, the Environmental Protection Agency now requires that total chromium discharges from pulp and paper mills be reported. Therefore, it is necessary to eliminate the presence of chromium in discharges from pulp and paper mills.

In the production of sodium chlorate, as noted above, chromium compounds containing chromium in the hexavalent state are added to the electrolyte in order to reduce the inefficiency at the cathode which would account for a significant decrease in current efficiency. Cathodic inefficiency reactions as set out below in formulas V and VI would account for a very significant decrease in current efficiency were it not for the use of hexavalent chromium ions in the electrolyte. Typically, chromium salts are included in the electrolyte in the amount of about 35 to about 2500 parts per million (Cr ion) or about 0.1 to about 7 grams per liter (as $Na_2Cr_2O_7.2H_2O$) in order to inhibit these cathodic inefficiency reactions. Accordingly, the product of an electrolytic cell for chlorate production contains alkali and/or alkaline earth metal chlorate, hypochlorite, and bichromate compounds. It is believed that the presence of sodium bichromate results in a modification of the cathode surface so that reduction of hypochlorite and chlorate is prevented.

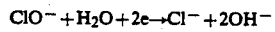

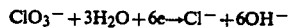

Once the hexavalent chromium ions in the chlorate solution are reacted with the reducing agent of the invention, particles of chromium compounds containing chromium in the trivalent state, i.e., chromium oxide can be separated from the liquid by any suitable solid-liquid separation method such as by settling, filtering, centrifuging and the like. Filtration is the preferred separation method. In the process of the invention, filtration occurs at a substantially faster rate as compared with prior art processes for removal of precipitate containing chromium compounds in the divalent or trivalent state. One skilled in the art will recognize that any other suitable separation technique can be employed. The precipitated particles of chromium compound containing chromium in the divalent or trivalent state after separation from the liquid, may be washed if desired or fed directly to electrolytic sodium chlorate cells or first oxidized to compounds containing chromium in the hexavalent state and then fed to electrolytic sodium chlorate cells, or otherwise disposed of. The filtrate produced by the process of the invention is an aqueous solution of sodium chlorate which is substantially free of chromium ions and contains less than ten parts per million of total chromium ions. As such, the filtrate is particularly useful as a feed for a chlorine dioxide generator, particularly, a chlorine dioxide generator in which methanol is used as the reducing agent, as described above.

Although the invention is described herein mainly with respect to the removal of chromium values from sodium chlorate solutions containing sodium chloride, the present invention has broad application to the removal of compounds containing chromium in the hexavalent state from any aqueous solution. While the process of the invention is considered to have the greatest applicability to the removal of compounds containing chromium in the divalent, trivalent, and hexavalent state from sodium chlorate solutions containing sodium chloride, the invention is particularly applicable to the removal of such compounds from any aqueous solution of a chromium compound such as any aqueous solution of alkali metal chlorates, for instance sodium chlorate, potassium chlorate, lithium chlorate, rubidium chlorate and cesium chlorate. The invention is also applicable to the removal of compounds containing chromium in the divalent, trivalent, and hexavalent state from aqueous solution of alkaline earth metal chlorates such as beryllium chloride, magnesium chlorate, calcium chlorate, strontium chlorate, barium chlorate and radium chlorate, and mixtures of two or more such chlorates, which may also contain dissolved quantities of alkali metal chlorides, alkaline earth metal chlorides, and mixtures thereof.

The invention has particular application to the treatment of aqueous solutions of sodium chlorate and sodium chloride produced by the electrolysis of an aqueous sodium chloride solution. As mentioned earlier, such solutions are commonly termed "cell liquor". The concentration of sodium chlorate and of sodium chloride in cell liquor may vary widely, depending on the extent of electrolysis of the initial sodium chloride solution. In addition, the cell liquor usually contains hypochlorite compounds. Generally, the concentration of sodium chlorate present may vary up to about 750 g/l, preferably about 250 to about 675 g/l and the concentration of sodium chloride present may vary from about 20 to about 300 g/l, preferably about 50 to about 300 g/l.

The reaction of the reducing agent of the invention, for instance, hydroxylamine sulfate with hexavalent chromium ions (as sodium bichromate dihydrate can be illustrated by the following equation:

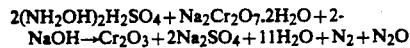
$$2(NH_2OH)_2H_2SO_4 + Na_2Cr_2O_7 \cdot 2H_2O + 2NaOH \rightarrow Cr_2O_3 + 2Na_2SO_4 + 11H_2O + N_2 + N_2O \quad \text{VII}$$

Accordingly, two moles of hydroxylamine sulfate are the stoichiometric amount required for reaction with one mole of chromium ion present as sodium bichromate dihydrate. Where the other useful reducing agents, hydroxylamine, hydroxylamine hydrochloride, and hydroxylamine formate are substituted for hydroxylamine sulfate, four moles are required for reaction with one mole of sodium bichromate dihydrate. In laboratory tests, use of this stoichiometric amount of hydroxylamine sulfate provided essentially 100% removal of chromium ion from aqueous solutions containing 0.7 grams per liter to 4.5 grams per liter of sodium bichromate dihydrate. At least a stoichiometric amount of reducing agent is required in the process of the invention. Preferably, an amount of about 10%, more preferably, about 5% in excess of the stoichiometric amount is used.

The hexavalent chromium ion present in the aqueous solution of sodium chlorate and sodium chloride, or other aqueous chlorate solutions, is usually added to the electrolyte in the form of sodium bichromate in an amount in the range of about 0.1 grams per liter to about 20.0 grams per liter of $Na_2Cr_2O_7 \cdot 2H_2O$ (about 35 parts per million to about 7000 parts per million Cr ion) preferably, about 0.2 g/l to about 10.0 g/l (about 70 to about 3500 ppm), typically about 1 to about 5 g/l (350–1750 ppm). This concentration is decreased by the process of the invention, generally, to about 0.03 g/l or less (about 10 ppm), preferably, about 0.015 g/l or less (about 5 ppm), and, most preferably, about 0.01 g/l or less (about 3 ppm).

Although the hexavalent chromium ions are usually added to the aqueous chloride electrolyte solution in the form of sodium bichromate ($Na_2Cr_2O_7 \cdot 2H_2O$), other forms of water-soluble hexavalent chromium ions can be employed, for example, sodium chromate ($Na_2CrO_4$), chromic acid ($H_2CrO_4$), potassium dichromate ($K_2Cr_2O_7$). Mixtures of two or more of such materials can be employed.

Figure 2:
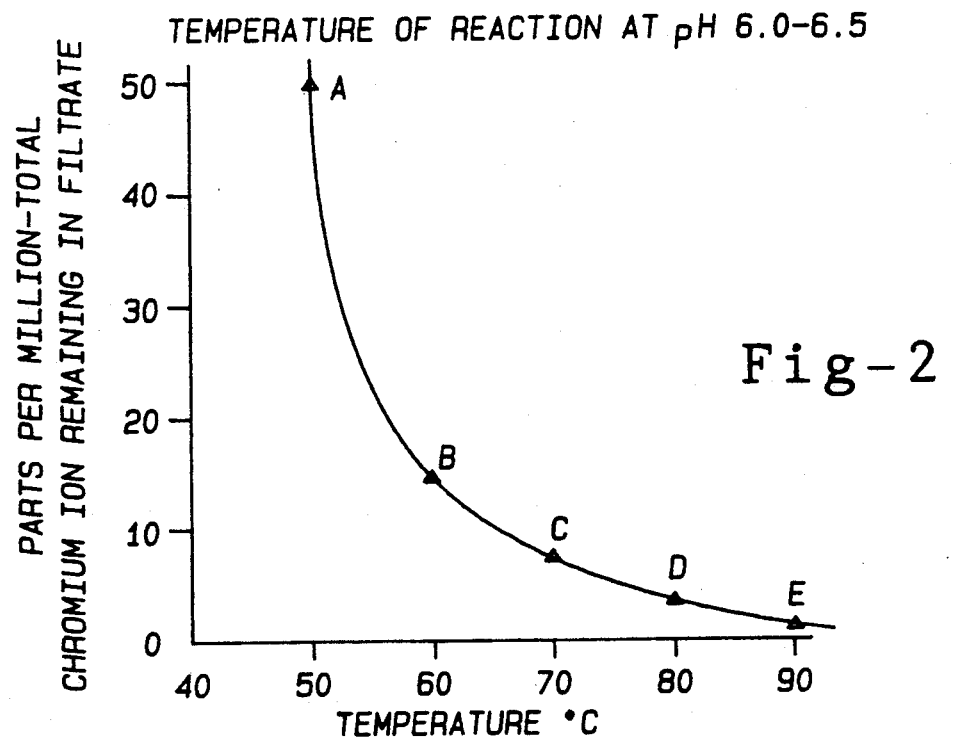
FIG. 2 is a graph showing the amount of hexavalent chromium ions remaining in the filtrate subsequent to reaction at pH 6.0-6.5 of hydroxylamine sulfate with an aqueous chlorate solution containing compounds containing chromium in the hexavalent state wherein the reaction is conducted at various temperatures and the precipitate formed at each reaction temperature is removed by filtration.

The temperature for conducting the reaction of the process of the invention is important in achieving an efficient removal of chromium ions. Generally, the process is carried out at an elevated temperature, generally, of about 50° C. to about 100° C., preferably, at about 70° C. to about 95° C., and, most preferably, at about 85° C. to about 95° C. As indicated in FIG. 2, the removal of chromium ions is markedly dependent upon the temperature of the reaction when the reducing agent of the invention is utilized in the process of the invention. In order to achieve a filtrate, subsequent to removal of the precipitated chromium compound, wherein the filtrate has less than about 10 parts per million of chromium ions content, it is necessary to perform the process of the invention at the above temperatures.

Similarly, the process of the invention for optimum results and the reduction of chromium ions to less than about 10 parts per million in the filtrate remaining subsequent to filtration of the precipitated portion of the reaction solution, it is necessary to utilize a neutral or an acid pH, generally, a pH of about 4.0 to about 6.5, preferably, about 4.5 to about 6.0, and, most preferably, about 5.0 to about 5.5. Where an acid pH higher than 6.5 or other non-optimal pH is used, improved separation of compounds containing chromium can be obtained by the use of a reaction temperature at the high end of the ranges stated above. Since hydroxylamine sulfate is highly acidic in aqueous solution and because the above reaction proceeds most rapidly at weakly acidic conditions, a pH of about 5.0 to about 5.5, a base is, most preferably, added to aqueous solutions having a pH lower than the above optimum pH range. The importance of pH is demonstrated graphically in FIG. 1 in which the letters A–E indicate separate experimental reactions in which the pH was adjusted to pH 4, 5, 6, 7, and 8.

The reaction time at elevated temperature of the process of the invention depends both upon the temperature at which the reaction is conducted and the pH of the reaction liquid. For the optimum speed of reaction, the pH should be adjusted to the most preferred range of about 5.0 to 5.5. As the temperature is increased from about 50° C. at which temperature the reaction takes over 30 minutes for completion, the reaction has been found to be complete in 30 minutes at a temperature of about 70° C. and the reaction has been found to be complete in only 10 minutes at a temperature of about 90° to about 95° C. With a temperature of about 50° C., the reaction would be complete in about 2 to about 3 hours.

The following examples illustrate the various aspects of the invention but are not intended to limit its scope. Where not otherwise specified throughout this specification and claims, temperatures are given in degrees centigrade and parts, percentages, and proportions are by weight/volume.

EXAMPLE 1

A solution produced from an electrolytic sodium chlorate cell containing 630 grams per liter of sodium chlorate, 70 grams per liter of sodium chloride, and 1.5 grams per liter of $Na_2Cr_2O_7.2H_2O$ (524 ppm Cr ion) was placed in a 1 liter beaker in the amount of 500 milliliters and heated to 80°–85° C. while stirring with a magnetic stirrer. Hydroxylamine sulfate in the amount of 0.85 grams was dissolved in 2-3 milliliters of water and added to the sodium chlorate solution. The pH was controlled at pH 4.0 by the addition of 3 normal sodium hydroxide solution. The reaction mixture was stirred for 30 minutes at pH 4 and then filtered through 1 micron filter paper using a Buchner funnel. The filtrate obtained was clear and had no color. The total chromium ions remaining in the clear solution were 6.3 parts per million. The precipitate of chromium compounds in the trivalent or divalent state which remain on the filter paper can be dissolved with sodium hypochlorite or added back to the electrochemical cell as a slurry where it will be reoxidized to soluble hexavalent chromium ions by the hypochlorite ions present therein.

EXAMPLES 2-4 (inventive), and 5 (control)

Example 1 was repeated except that the reaction was conducted at 80° C. to about 85° C. and successively at a pH of 5, 6, 7, and 8. The results obtained indicate optimum removal of chromium compounds at a pH of about 5.5.

The results of Examples 1-5 form the basis of the graph shown in FIG. 1 in which points A-E on the curve, respectively, represent the pH conditions under which the reactions described in examples 1-5 were performed.

EXAMPLE 6 and 7 (controls)

The process of Example 1 was repeated except that during the 30 minute reaction the pH was controlled at 6.0–6.5 and the reaction temperature was successively 50° C. and 60° C. The filtrate of Example 6 contained total chromium ions in the amount of about 50 parts per million and the filtrate of Example 7 contained about 15 ppm chromium ions.

EXAMPLE 8

The process of Example 6 was repeated at a pH of 6.0–6.5. The temperature of the 30 minute reaction was 70° C. Example 8 forms partial basis for the graph shown as FIG. 2 in which a temperature of reaction of 70° C. or higher is shown to be critical at this pH to obtaining satisfactory removal of total chromium compounds so that less than about 10 parts per million chromium ion remains in the filtrate subsequent to reaction. The filtrate of Example 8 contained about 8 parts per million chromium ions.

EXAMPLES 9 & 10

Example 6 was repeated except that during the 30 minute reaction the pH was controlled at pH 6.0–6.5 and the reaction temperature was successively controlled at 80° C. or 90° C. The filtrate of Example 9 contained about 3 parts per million chromium ions and the filtrate of Example 10 contained about 1 part per million chromium ions.

EXAMPLE 11

An additional unexpected advantage of the process of the invention is the fact that the solid particles precipitated out of the chlorate solution during the process of the invention are more easily filtered than are reaction products of prior art removal processes. In order to demonstrate the marked difference in filtration rate between the solids produced in the process of the invention in which the pH was maintained at pH 5.5 in comparison with the same reaction in which the pH was maintained at pH 8, Example 1 was repeated except that the reaction time was 45 minutes. The pH was maintained at 5.5 and the reaction temperature was maintained at 70° C. The chromium ions in the filtrate subsequent to reaction were found to be 1.0 part per million and the filtration time was found to be 8 minutes and 20 seconds. This compares favorably with the filtration rate of 13 minutes and 40 seconds obtained in the following control Example.

EXAMPLE 12 (control)

Example 1 was repeated except that the reaction time was 45 minutes and the reaction was conducted at a pH of 8 and a reaction temperature of 70° C. The filtration time was found to be 13 minutes and 40 seconds.

EXAMPLE 13

Example 11 was repeated except that instead of hydroxylamine sulfate as the reducing agent, hydroxylamine hydrochloride was used in the same amount. The reaction produced a filtrate having a chromium ion concentration of 0.6 part per million. The filtration time was 8 minutes and 5 seconds.

EXAMPLE 14 (control)

Example 13 was repeated except that a pH of 8.0 was maintained during the reaction. The chromium ion content of the filtrate was found to be 17.7 parts per million and the filtration time was found to be 12 minutes and 10 seconds.

EXAMPLE 15

The precipitation and recycle of heavy metal impurities during removal of chromium compounds from aqueous solutions, particularly aqueous solutions of alkali or alkaline earth metal chlorate, is of concern where the precipitated components are recycled back to an electrolytic cell for the production of an alkali or alkaline earth metal chlorate. Accordingly, heavy metal impurities, as listed in Table I below were added to a sodium chlorate solution containing 630 gpl of sodium chlorate and 70 gpl of sodium chloride. The solution also contained a chromium compound concentration of 1.47 gpl of $Na_2Cr_2O_7 \cdot 2H_2O$. In the table, heavy metal ion concentrations are shown before and after removal of chromium compounds utilizing hydroxylamine sulfate (HAS) in a stoichiometric amount based upon the concentration of chromium compound at a temperature of 80° C. allowing a reaction time before filtration of 30 minutes. The reaction was conducted at the pH indicated in the table. For comparison, a stoichiometric amount sodium sulfite was utilized to remove chromium compounds instead of hydroxylamine sulfate. The sodium sulfite was utilized in a 12:1 molar ratio of sulfite ion to chromium ion present as the chromium compound indicated above.

Referring now to Table I, it is noted that a high concentration of heavy metal ion in the filtrate, indicating high solubility in the filtrate, implies that less heavy metal ion impurity will be recycled back to the electrolytic cell for the preparation of sodium chlorate. The avoidance of recycling of heavy metal ions, particularly manganese, calcium, and zinc is important in view of the fact that such metals are known to plate on to the electrodes of the electrochemical cell thereby reducing cell efficiency. From a review of Table I, it can be seen that adjusting the pH from the acid pH levels of the process of the present invention to an alkaline pH range lowers the solubility of compounds containing heavy metal ions. Thus, substantially higher solubilities of manganese, calcium and zinc compounds are obtained at a pH of 5.5 as opposed to a pH of 8. Accordingly, the process of the invention is advantageous, not only for the removal of chromium compounds from the filtrate and the recycling of these chromium compounds back to an electrochemical cell for the production of sodium chlorate but, in addition, the process of the invention provides for the removal in the filtrate, and thus the avoidance of recycling to an electrochemical cell of heavy metal ions, particularly manganese, calcium and zinc ions which are known to have a deleterious effect upon electrochemical cell electrodes.

TABLE I

| | Impurity Concentration | | | |
| --- | --- | --- | --- | --- |
| Impurity Type | In Original Chlorate (ppm) | After HAS pH 5.5 (ppm) | After HAS pH 8.0 (ppm) | After Sulfite pH 8.5 (ppm) |
| Fe | 0.1 | <0.050 | <0.050 | <0.050 |
| Mn | 2.25 | 1.50 | 0.035 | <0.020 |
| Ca | 5.00 | 4.00 | <0.500 | <0.500 |
| Zn | 4.70 | 0.440 | <0.020 | 0.050 |

While this invention has been described with reference to certain specific embodiments, it will be recognized by those skilled in the art that many variations are possible without departing from the scope and spirit of the invention and it will be understood that it is intended to cover all changes and modifications of the invention disclosed herein for the purposes of illustration which do not constitute departures from the spirit and scope of the invention.

The invention in which an exclusive property or privilege is claimed is defined as follows:

1. A process for the removal of at least one compound containing chromium in the divalent, trivalent, or hexavalent state in a first aqueous solution, said process comprising:

(A) adding to said first aqueous solution a reducing agent selected from the group consisting of hydroxylamine, an addition compound thereof, and a salt thereof in at least a stoichiometric amount of the amount required to react with the chromium ions in said first aqueous solution and reacting at an elevated temperature and a neutral or an acid pH in order to precipitate solid particles of at least one compound containing chromium in the trivalent state, the divalent state or mixtures thereof in said first, aqueous solution and (B) separating said solid particles from said first aqueous solution to obtain a second aqueous solution containing about 10 parts per million or less of total chromium ion.

2. The process of claim 1 wherein said first, aqueous solution is an aqueous solution of an alkaline earth metal chlorate or an alkali metal chlorate produced by the electrolysis of an alkaline earth metal chloride or an alkali metal chloride wherein said first, aqueous solution comprises alkali metal or alkaline earth metal chlorate, chloride, and bichromate compounds.

wherein said reducing agent is selected from the group consisting of hydroxylamine, hydroxylamine sulfate, hydroxylamine formate, and hydroxylamine hydrochloride, wherein said solid particles are separated from said aqueous solution by filtration, and wherein said process is conducted at a reaction temperature of about 50° C. to about 100° C. and at a pH of about 4.0 to about 6.5.

3. The process of claim 2 wherein the concentration of sodium bichromate in said first, aqueous solution is about 0.1 to about 20 grams per liter as $Na_2Cr_2O_7 \cdot 2H_2O$, said aqueous alkali metal chlorate is sodium chlorate present in the amount of up to about 750 grams per liter, said second, aqueous solution contains about 5 parts per million or less of total chromium ion, and said process is a batch process conducted at a reaction temperature of about 70° C. to about 95° C. and a pH of about 5.0 to about 5.5.

4. The process of claim 2 wherein the concentration of said bichromate compound in said first, aqueous solution is about 0.1 to about 20 grams per liter, said aqueous alkali metal chlorate is sodium chlorate present in the amount of about 100 grams per liter to about 750 grams per liter, said second, aqueous solution contains about 5 parts per million or less of total chromium ion, and said process is a continuous process.

5. The process of claim 3 wherein said reducing agent is hydroxylamine present in the amount of at least 4 mols of said reducing agent to 1 mol of said chromium ions present as bichromate ions.

6. The process of claim 3 wherein said reducing agent is hydroxylamine sulfate present in the amount of at least 2 mols of said reducing agent to 1 mol of said chromium ions present as bichromate ions.

7. The process of claim 3 wherein said reducing agent is hydroxylamine hydrochloride present in the amount of at least 4 mols of said reducing agent to 1 mol of said chromium ions present as bichromate ions.

8. The process of claim 3 wherein said reducing agent is hydroxylamine formate present in the amount of at least 4 mols of said reducing agent to 1 mol of said chromium ions present as bichromate ions.

9. A batch or continuous process for the recycling of chromate values which are present during the production in an electrolytic cell of a first, aqueous alkaline earth metal or alkali metal chlorate solution for use as a feed for a chlorine dioxide generator wherein the chromium compound concentration, comprising a bichromate compound, in said aqueous alkali or alkaline earth metal chlorate solution is reduced in total chromium ion concentration by said process to about 10 parts per million or less prior to feeding said aqueous solution to said chlorine dioxide generator and wherein compounds containing chromium in at least one of the trivalent or divalent states are separated as solids from said aqueous solution and recycled to said electrolytic cell, said process comprising:

(A) adding to said alkali metal or alkaline earth metal, aqueous chlorate solution a reducing agent selected from the group consisting of hydroxylamine, an addition compound thereof and a salt thereof, said reducing agent being present in at least a stoichiometric amount of the amount required to react with said bichromate compound present in said first, aqueous chlorate solution, (B) reacting said first aqueous chlorate solution with said reducing agent at elevated temperature and neutral or acid pH conditions to form solid particles of compounds containing chromium in at least one of the divalent or trivalent state in said first, aqueous chlorate solution, (C) separating said solid particles from said first aqueous chlorate solution to obtain a second, aqueous solution containing about 10 parts per million or less of chromium ion, (D) recycling said solid particles to said electrolytic cell for the production of an alkali metal chlorate, and (E) feeding said second, aqueous solution to a reactor for the generation of chlorine dioxide.

10. The process of claim 9 wherein said first, aqueous solution comprises chlorate, chloride, and bichromate compounds wherein said alkali metal chlorate is present in the amount of up to about 750 grams per liter, wherein said compound containing chromium is present in the amount of about 0.1 to about 20 grams per liter as $Na_2Cr_2O_7.2H_2O$, and wherein said process is conducted at a reaction temperature of about 50° C. to about 100° C. and at a pH of about 4.0 to about 6.5.

11. The process of claim 10 wherein said reducing agent is selected from the group consisting of hydroxylamine, hydroxylamine sulfate, hydroxylamine formate, and hydroxylamine hydrochloride.

12. The process of claim 11 wherein of said reducing agent is hydroxylamine sulfate present in a concentration of at least 2 mols of hydroxylamine sulfate to one mol of said dichromate ions and said process is conducted at a temperature of about 70° C. to about 95° C. at a pH of about 5.0 to about 5.5.

UNITED STATES PATENT AND TRADEMARK OFFICE
CERTIFICATE OF CORRECTION

PATENT NO. : 5,211,853
DATED : May 18, 1993
INVENTOR(S) : John R. Jackson, et. al.

It is certified that error appears in the above-indentified patent and that said Letters Patent is hereby corrected as shown below:

In column 1, line 32, the formula should read

---$Na_2Cr_2O_7 \cdot 2H_2O$---.

Signed and Sealed this

Fifteenth Day of March, 1994

Attest:

BRUCE LEHMAN

Attesting Officer     Commissioner of Patents and Trademarks